US009490926B2

(12) United States Patent
Kim et al.

(10) Patent No.: US 9,490,926 B2
(45) Date of Patent: Nov. 8, 2016

(54) PROCESSOR TIME SYNCHRONIZATION APPARATUS AND METHOD IN DATA COMMUNICATION SYSTEM WITH MULTIPLE PROCESSORS AND LINE INTERFACES

(71) Applicant: Electronics and Telecommunications Research Institute, Daejeon-si (KR)

(72) Inventors: Bup-Joong Kim, Daejeon-si (KR); Tae-Sik Cheung, Daejeon-si (KR); Bheom-Soon Joo, Daejeon-si (KR); Jong-Hyun Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 241 days.

(21) Appl. No.: 14/083,561

(22) Filed: Nov. 19, 2013

(65) Prior Publication Data

US 2014/0298070 A1    Oct. 2, 2014

(30) Foreign Application Priority Data

Mar. 29, 2013  (KR) .......................... 10-2013-0034810

(51) Int. Cl.
G06F 1/12      (2006.01)
H04J 3/06      (2006.01)
H04N 21/43     (2011.01)

(52) U.S. Cl.
CPC ............ *H04J 3/0697* (2013.01); *H04J 3/0667* (2013.01); *H04N 21/4302* (2013.01)

(58) Field of Classification Search
CPC ....... G06F 1/12; H04J 3/0667; H04J 3/0697; H04N 21/4302
See application file for complete search history.

(56) References Cited

U.S. PATENT DOCUMENTS 5,041,966 A * 8/1991 Nakai ................... G06F 1/12
                                                 713/375
5,402,394 A * 3/1995 Turski ................. H04J 3/0664
                                                 368/10

(Continued)

FOREIGN PATENT DOCUMENTS

KR   10-2004-0057040 A   7/2004
WO   WO-03/009151 A1    1/2003
WO   WO 2012-108387 A1  8/2012

OTHER PUBLICATIONS

Eidson, J. (Oct. 10, 2005). Retrieved from National Institute of Standards and Technology: http://www.nist.gov/el/isd/ieee/upload/tutorial-basic.pdf.*

*Primary Examiner* — Nitin Patel
*Assistant Examiner* — Kevin Stewart
(74) *Attorney, Agent, or Firm* — Rabin & Berdo, P.C.

(57) ABSTRACT

A processor time synchronization apparatus and method in a data communication system which includes a plurality of processors and line interfaces. The processor time synchronization apparatus includes a first local processor configured to recognize a time difference between an external device and the system based on a time message exchanged with the external device, and synchronize time between the external device and the system, and a second local processor configured to receive time information from the first local processor that has been time-synchronized with the external device, the time information containing the time difference between the external device and the system, and synchronize the first local processor with a system's internal time using the received time information.

17 Claims, 5 Drawing Sheets (56) References Cited

U.S. PATENT DOCUMENTS

| | | | |
|---|---|---|---|
| 6,236,251 B1* | 5/2001 | Akamatsu | G06F 1/10 327/144 |
| 7,024,579 B2 | 4/2006 | Battaia | |
| 7,589,595 B2 | 9/2009 | Cutler | |
| 7,885,296 B2 | 2/2011 | Biederman et al. | |
| 8,225,128 B2 | 7/2012 | Blixt et al. | |
| 9,264,213 B2 | 2/2016 | Kozaki et al. | |
| 2002/0186716 A1* | 12/2002 | Eidson | H04J 3/0673 370/503 |
| 2005/0058159 A1* | 3/2005 | Chapman | H04J 3/0694 370/510 |
| 2010/0080249 A1* | 4/2010 | Li | H04J 3/0688 370/503 |
| 2013/0010814 A1* | 1/2013 | Miyabe | H04J 3/0652 370/503 |
| 2013/0208769 A1* | 8/2013 | Carmon | H04J 3/0685 375/219 |
| 2013/0219207 A1* | 8/2013 | Milota | G06F 1/12 713/400 |
| 2013/0266306 A1* | 10/2013 | Kozaki | H04J 3/0655 398/5 |

* cited by examiner

PROCESSOR TIME SYNCHRONIZATION APPARATUS AND METHOD IN DATA COMMUNICATION SYSTEM WITH MULTIPLE PROCESSORS AND LINE INTERFACES

CROSS-REFERENCE TO RELATED APPLICATION(S)

This application claims priority from and the benefit under 35 U.S.C. §119(a) of Korean Patent Application No. 10-2013-0034810, filed on Mar. 29, 2013, which is hereby incorporated by reference for all purposes as if fully set forth herein.

BACKGROUND

1. Field

The following description relates to time synchronization of a data communication system that serves a data relay transmission function, and more particularly, to a device and method for allowing reliable external and internal high time-resolution time synchronization and time data sharing by use of a simple structure at a low cost in a data communication system with multiple processors and line interfaces.

2. Description of the Related Art

High-speed data communication technology enables the reduction of time expenditure for data transmission between physically remote locations. Physical space is not a significant limiting factor in data sharing any more. To perform the same task, collaboration task, or distributed task at physically distant locations simultaneously or on a schedule, two locations' times have to be synchronized in accordance with a degree of precision for the task. In other words, distant spaces in which to perform time-synchronized tasks have to all share the same precise time.

With the development of automation technology, many processes and tasks are performed by an automation device under the control of a controller, the automation device being implemented as a complex automation device that incorporates one or more unit automation devices. The complex automation device internally divides a single task into a number of jobs to process. A plurality of controllers is present in the complex automation device, and when all controllers have the same time information, it is possible to complete the single task as a whole by executing the divided jobs in the automation device. In this case, the controllers within the automation device may be synchronized to a local time that is independent of an external device.

When automation devices of different groups are not located within a given area, but located at different areas by their groups, and especially when the groups are quite distant from one another, they must have the same time to execute a synchronized task. That is, only when the devices' internal time is synchronized to a common time exterior to the devices, not to an internal local time, they can consistently work together in the physically remote areas. For particular devices in different spaces to execute a task synchronously, time synchronization between the spaces is a prerequisite, and seamless data transmission/reception and information sharing for task execution are required.

In this regard, a data communication device is required to transmit and relay general data information, as well as time information, and to enable the sharing of external and internal time information. The data communication device should be able to adjust its time to an external master time through time synchronization and correction, and provide the same time information to a remote device requesting time information, based on the adjusted internal time. Thus, when the data communication device capable of data relay-transmission serves several functions like general-data relay-transmission, time sharing, and time correction, the remote devices are able to share the time, and synchronously perform a task.

The time synchronization and data relay functions of the data communication device may be implemented differently, depending on the configuration and location of the device. In addition, the data communication device has different numbers and capabilities of processors in use depending on the number of connection lines connected to the external device and the data processing capacity. A high-capacity high-performance data communication device has a plurality of independent processors, which are distributed in blocks. Generally, processors use time for data processing, data control and management, and record and storing of important log history. A number of processors need to have the same time, and this time should be synchronized to an external time.

The data communication device can provide and correct time information with respect to the external device, and perform internal time-based jobs if the data communication device includes a means for obtaining the time of a reliable external device, and a means for allowing internal processors to share the time of the external device.

A real time processing needs to be accompanied for sharing and recognizing time information accurately. On general-purpose OS, such as Linux, it is difficult to execute processing in real time with high time resolution by only using software. A data communication device operating on a general-purpose OS needs to employ an additional device and method for time synchronization at high time precision.

RELATED ART DOCUMENTS

U.S. Pat. No. 7,885,296 (published on Feb. 8, 2011) relates to synchronization among multiple timestamp counters, and discloses external timestamp counter devices for synchronizing the timestamp counters. The timestamp counters are set and synchronized by the same processor. Generally, in a data communication system including a plurality of blocks (cards), a system's internal timestamp counters are located in blocks, and thereby processors that control the internal timestamp counters differ from one another. However, this reference does not suggest or disclose configurations for, and effects of, synchronization among the timestamp counters under the control of another processor. In addition, the reference does not disclose techniques related to the selection, treatment, and processing of external time messages received through multiple line interfaces of a data communication system.

U.S. Pat. No. 7,589,595 (published Oct. 15, 2009) discloses a correction processor connected to an oscillator that uses precision timing signals propagated over a digital network to generate an error signal. This reference does not disclose a data communication system that synchronizes the time of an internal processor with an external device's time or the time among internal processors. In addition, the reference document does not disclose techniques related to the selection, treatment, and processing of external time messages received through multiple line interfaces of a data communication system.

Korean Patent Publication No. 10-2004-0057040 (published on Jul. 1, 2004) relates to a processor communication device in which a processor card and a plurality of line cards are connected to each other through a common signal line. The processor card generates a clock to synchronously process data communications between the line cards by making the maximum use of a program logic device used for control devices on a communication-related board. The reference only relates to a processor communication technology capable of overcoming problems, such as, additional costs and software load for processor communication operation, which may be caused by a limited number of input/output signal lines and the use of a common-use communication chip in the existing processor communication method. This reference does not disclose techniques related to the selection, treatment, and processing of external time messages received through multiple line interfaces of a data communication system. Further, the reference does not disclose a data communication system that synchronizes the time of an internal processor with an external device's time or the time among internal processors.

International Patent Application No. PCT/IB2002/002896 (published on Jan. 30, 2003) relates to a multiprocessor device, an optimized synchronization method, and an access control method. The reference document discloses a technique in which by providing a plurality of waiting timers, each dedicated to each processor, it is possible to prevent relatively long read access time of a non-volatile memory, which may be led to by differing clock rates of processors sharing the same non-volatile memory, and to allow each of the wait timers to be synchronously clocked with its associated processor. The reference, however, is only directed at processors sharing a non-volatile memory, and does not disclose a data communication system that synchronizes the time of an internal processor with an external device's time or the time among internal processors. Moreover, the reference does not suggest techniques related to the selection, treatment, and processing of external time messages received through multiple line interfaces of a data communication system.

SUMMARY

The following description relates to a processor time synchronization apparatus and method in a data communication system which includes a plurality of processors and line interfaces, the apparatus and method capable of performing reliable system's external and internal high time-resolution time synchronization, and sharing time information by use of a simple structure at a low cost.

In one general aspect, there is provided a processor time synchronization apparatus in a data communication system which includes a plurality of processors and line interfaces, the processor time synchronization apparatus including: a first local processor configured to exchange time messages with an external device, extract a time difference between the first local processor and the external device from a received time message, and synchronize time between the first local processor and the external device using the extracted time difference; and a second local processor configured to, after time-synchronization between the first local processor and the external device, capture a personal timer in response to the first local processor's activating a trigger bus, receive or read a timer value captured by the first local processor from the first local processor, and synchronize system internal time with the first local processor using the difference between the captured timer value of the first local processor and the captured timer value of the second local processor.

In response to the time-synchronization with the external device, the first local processor may activate the trigger bus to control all processors connected to the trigger bus to capture their personal timers.

The first local processor may reflect the extracted time difference to a personal timer offset to synchronize time between the timer of the first local processor and the external device.

The second local processor may compare its personal captured timer value with the captured timer value of the first local processor to obtain a difference therebetween, and reflects the obtained difference to a timer offset of the second local processor so as to synchronize the personal timer with the timer of the first local processor.

The processor time synchronization apparatus may further include: a first data processor configured to recognize the time message exchanged with the external device, and deliver the time message to the first local processor, display processing time of the first data processor in the time message, and synchronize its personal time to a system's internal time; and a second data processor configured to receive time information from the first data processor which has been time-synchronized with the external device, the time information containing a time difference between the external device and the data communication system, and synchronize the first data processor with the system's internal time using the received time information.

The first and second data processors may be activated or deactivated via a time information synchronization bus.

The first and second data processors may each recognize a time message received from the external device through a data path, reflect a duration in which the time message is present in the data processor to a time correction field in the time message, and deliver the time message to a corresponding local processor through a message channel, and the local processor that receives the time message through the message channel reads a time information field in the time message to identify a departure time of the time message and the duration of time in which the time message was present in the data processor, and makes a record of an arrival time of the time message with a personal timer of the local processor.

A system-synchronous clock in common to processors may be converted into a timer reference clock of each processor, and then input to a timer clock of each processor, or the system-synchronous clock may be input to the timer clock intact, and the timer of each processor changes a timer value in accordance with the timer clock.

In another general aspect, there is provided a processor time synchronization apparatus in a data communication system which includes a plurality of processors and line interfaces, the processor time synchronization apparatus including: a main processor configured to receive time information containing a time difference between each of the local processors and each of the external devices from the local processor, analyze the received time information to select one of external devices, and direct a first local processor that has exchanged a time message with the selected external device to compensate for the time difference; the first local processor configured to recognize a time difference between the data communication system and an external device by exchanging a time message with the external device, deliver time information containing the recognized time difference to the main processor, and synchronize time between the external device and the data communication system in response to the main processor's instruction to compensate for the time difference; and a second local processor configured to receive the time information from the time-synchronized first local processor, and synchronize the first local processor with a system's internal time using the received time information.

The first local processor may receive the time message from the external device, extract the time difference between itself and the external device from the received time message, transmit the extracted time difference to the main processor, reflect the time difference to a timer offset of the first local processor in response to the main processor's instruction to compensate for the time difference, thereby synchronizing time between a personal timer and the external device.

The first local processor or the main processor, which has been time-synchronized with the external device, may activate a trigger bus to control all processors connected to the trigger bus to capture their personal timers.

The second local processor may capture a personal timer in response to a trigger bus being activated by the first local processor or the main processor, which has been time-synchronized with the external device, receive or read a timer value captured by the first local processor that has been time-synchronized with the external device, compare a captured timer value of the first local processor that has been time-synchronized with the external device with a timer value captured by the second local processor to calculate a difference therebetween, and reflect the calculated result to a personal timer offset to synchronize the personal timer with the timer of the first local processor that has been time-synchronized with the external device.

The main processor may receive time information containing a time difference between each of the local processors and each different external device and information about the external device from the local processor, and analyze performance of the external device based on the received time information to select time information of a particular external device as reference time information of the system.

The local processors may independently transmit and receive a time message independently of each other to and from different external devices, and the main processor may activate or deactivate the transmission and reception of the time message of each local processor.

The processor time synchronization apparatus may further include a data processor configured to recognize a time message, transmit the time message to a corresponding local processor, display a personal processing time in the time message, and synchronize the personal time to the system's internal time.

The system-synchronous clock in common to processors may be converted into a timer reference clock of each processor, and then input to a timer clock of each processor, or the system-synchronous clock may be input to the timer clock intact, and the timer of each processor may change a timer value in accordance with the timer clock.

The processor time synchronization apparatus may further include a switching unit configured to deliver the time information between the local processors and the main processor through a system network channel.

In yet another general aspect, there is provided a processor time synchronization method of a processor time synchronization apparatus in a data communication system which includes a plurality of processors and line interfaces, the processor time synchronization method including: an external time synchronization stage including: exchanging, at a first local processor, time messages with an external device, extracting a time difference between the first local processor and the external device from a received time message, and synchronizing time between the first local processor and the external device using the extracted time difference; and an internal time synchronization stage including, after time-synchronization between the first local processor and the external device, capturing, at a second local processor, a personal timer in response to the first local processor's activating a trigger bus, receiving or reading a timer value captured by the first local processor from the first local processor, and synchronizing a system's internal time with the first local processor using a difference between the captured timer value of the first local processor and the captured timer value of the second local processor.

The external time synchronization stage may include: recognizing, at the first local processor, a time difference between the external device and the data communication system based on the time message exchanged with the external device; delivering time information containing the recognized time difference to the main processor; analyzing, at the main processor, the received time information and directing the first local processor to compensate for the time difference; and synchronizing, at the first local processor, time between the external device and the data communication system in response to the main processor's instruction to compensate for the time difference.

The internal time synchronization stage may include, after the time synchronization between the first local processor and the external device, capturing, at the second local processor, a personal timer in response to the first local processor's activating the trigger bus, receiving or reading the timer value captured by the first local processor from the first local processor, comparing the timer value captured by the first local processor and the captured timer value of the second local processor to calculate a difference therebetween, and synchronizing the timer of the second local processor to the timer of the first local processor by reflecting the calculated difference to the timer offset of the second local processor.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
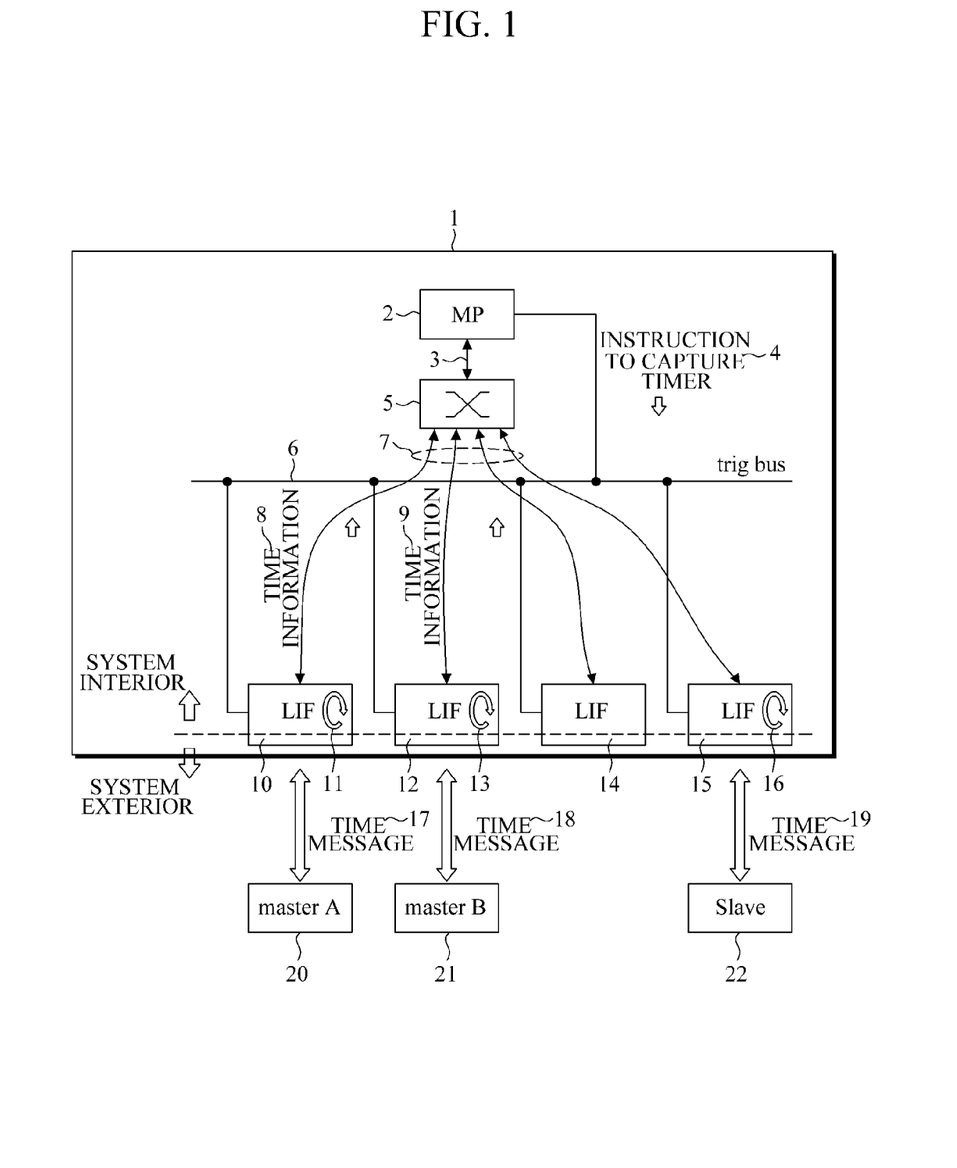
FIG. 1 is diagram illustrating a processor time synchronization apparatus in a data communication system with a plurality of processors and line interfaces, according to an exemplary embodiment of the present invention.

FIG. 1 is diagram illustrating a processor time synchronization apparatus of a data communication system having a plurality of processors and line interfaces, according to an exemplary embodiment of the present invention.

Referring to FIG. 1, a data communication system 1 includes a plurality of line interface units (LIFs, or alternatively, LIUs) 10, 12, 14, and 15. Each of the LIFs 10, 12, 14, and 15 includes a local processor and a data processor.

In the data communication system 1, each of the LIUs 10, 12, 14, and 15 includes a processor with a personal timer. The different processors exchange time information with remotely located external devices through the respective line interfaces. At this time, time is synchronized between each of the external devices and each of the internal processors by selecting, generating, and processing time information, and time is synchronized between the internal processors based on the time synchronization with the external devices. Accordingly, a local processor and a data processor of each LIU 10, 12, 14, and 16, and a main processor 2 are able to have the same time information, and this process takes place in real time.

The local processors of the LIUs 10, 12, 14, and 15 may individually transmit and receive a time message to/from the external devices. For example, as shown in FIG. 1, the local processor of the LIU 10 receives time information from external master device A 20, the local processor of the LIU 12 receives time information from external master device B 21, and the local processor of the LIU 16 receives time information from external slave device 19. However, aspects of the present invention are not limited thereto, such that the number and the targets of the processors may vary.

When receiving the time messages 17 and 18 from the external master devices 20 and 21, the local processors of the respective LIUs 10 and 12 extract a time difference between each of the external master devices 20 and 21 and the data communication system 1 from the received time messages 17 and 18. Then, the local processors of the LIUs 10 and 12 may transmit the extracted time differences and time information 8 and 9 regarding the external master devices 20 and 21, to the main processor 2 of the system 1.

The time messages 17 and 18 may be transmitted to any LIUs 10, 12, 14 and 15 of the system 1 through various data paths. This structure allows the LIUs 10, 12, 14, and 15 to receive the time messages 17 and 18 from the external master devices 20 and 21, and allows the system 1 to flexibly respond to the changes in line interfaces in accordance with the changes in the external data path, wherein the line interfaces are inlet and outlet ports for the time messages 17 and 18.

In one example, the data communication system 1 includes a data switching unit (not illustrated in FIG. 1) to relay general data of the LIUs 10, 12, 14, and 15, and a control data switching unit 5 to transmit and receive messages between the processors existing inside system 1. The control data switching unit 5 and the data switching unit may be physically separate from each other or integrated into one unit. In a case of the main processor 2 being physically separate from the local processor, the local processors of the respective LIUs 10, 12, 14, and 15 deliver the time information 8 and 9 to the main processor 2 through system network channels 7 and 3 that are connected to the control data switching unit 5.

The main processor 2 checks the time resolution and stability of each external master device from the time information 8 and 9 transmitted from the local processors of the LIUs 10, 12, 14, and 15, then selects one of the external master devices based on the checked time resolution and stability, and synchronizes the time of the processors of system 1 to the time of the selected external master device. For example, the main processor 2 may select the time information 8 of external master device A 20. In this case, the local processor that exchanges a message with the selected external master device may compensate its personal timer for the difference in time between the local processor and the selected external master device, so as to synchronize its personal time to the external master device. In the internal time synchronization process, which will be described later, the timer of this particular local processor serves as a reference time for the internal time synchronization, and this local processor becomes a system reference time processor.

Hereinafter, an internal time synchronization process that allows processors within system 1 to be time-synchronized with each other will be described with reference to FIG. 1.

In one example, for the internal time synchronization, a trigger bus 6 is provided to enable the processors to simultaneously capture their personal timers, and the processors that require the trigger bus 6 time synchronization are connected.

The main processor 2 activates the trigger bus 6 in response to a timer capture instruction 4, and controls the processors 10, 12, 14, and 15 to capture their personal timers. Upon the main processor's activating the trigger bus 6, the processors 10, 12, 14, and 15 connected to the trigger bus 6 simultaneously capture their personal timers, and store the captured timers. Then, through system control network channels 3 and 7, the processors 10, 12, 14, and 15 share a timer captured by the local processor that has a reference time for internal time synchronization across system 1, and thus serves as a system reference time processor.

Thereafter, the processors compare their captured timer values and the system reference time processor's captured timer values, and extract a difference between the timer values. Then, the processors apply the extracted difference value to their timer offset to adjust the timer by the timer offset, thereby synchronizing their personal timers to the system reference time processor. The internal time synchronization process may be performed by a simultaneous processor timer capturing process by hardware or unrestricted real-time post-processing software process.

In another example of the internal time synchronization process, the local processors receive the time messages 17 and 18 from the external master devices 20 and 21, and transmit the received time messages to the main processor 2. Then, the main processor 2 instructs a specific local processor to perform a system external and internal time synchronization process. In response to the instruction from the main processor 2, the specific local processor transmits and receives an additional time message to and from the external master device that has previously transmitted the time message to the specific local processor, and extracts a time difference. Then, the specific local processor controls other processors to compensate for the extracted time difference by using a time synchronization means within the system.

As described above, the main processor 2 may activate or deactivate a time message transmission/reception function of the local processors. Moreover, the main processor 2 may control the local processors to perform time synchronization across the entire system. In the internal time synchronization process, roles and functions of the main processor 2 and the local processors may vary.

The main processor 2 that plays a main role in time synchronization between the system's internal processors may be a processor located in an additional LIU or may be a particular local processor.

The local processors may transmit the time information 8 and 9 thereof to the main processor 2, the main processor 2 may read the time information 8 and 9 with a polling method, or the local processor activates an interrupt channel connected to the main processor to make the main processor 2 read the time information 8 and 9 by using interrupt.

In one example, each local processors of the LIUs 10, 12, 14, and 15 synchronizes the external master device and the system 1, and also controls the external slave device 22 to be synchronized to the time of the local processor. In this case, each local processor of the LIUs 10, 12, 14, and 15 transmits and receives a time message 19 to and from the external slave device 22 and processes (16) the time message 19 to synchronize the time of the local processor with the external slave device 22.

Figure 2:
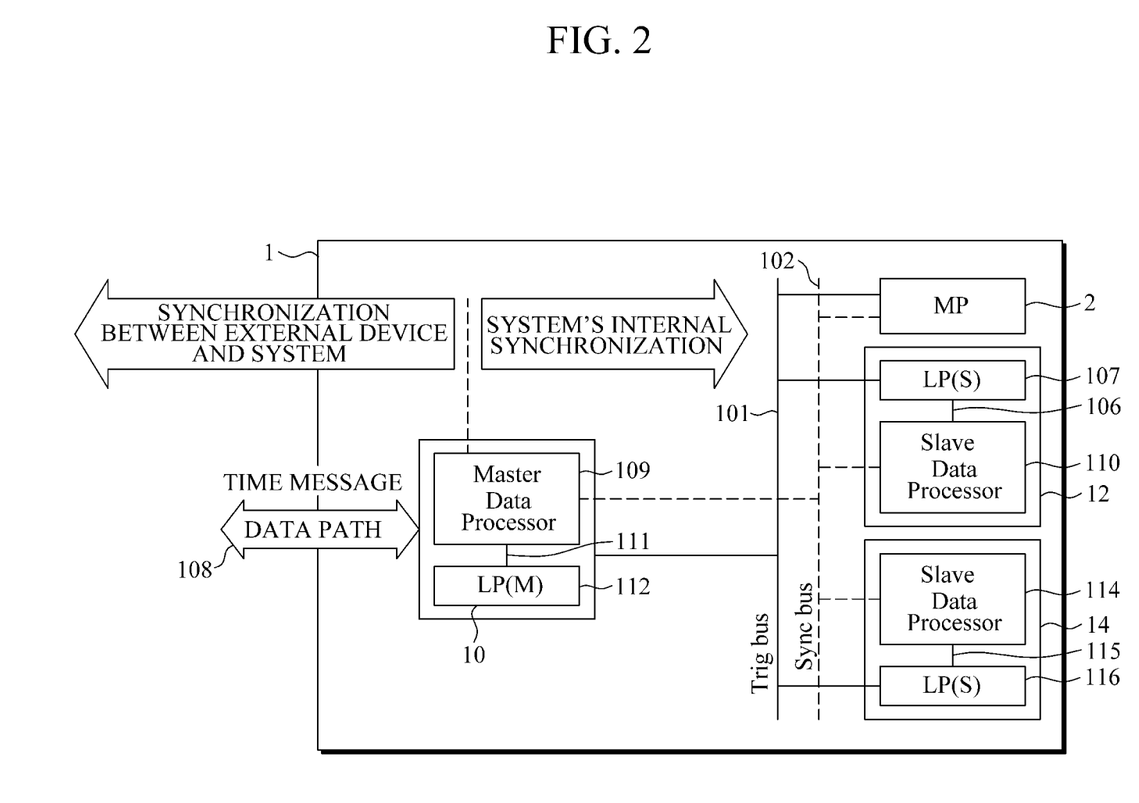
FIG. 2 is a diagram illustrating a processor time synchronization apparatus in a data communication system in detail for explaining system's external and internal time synchronization process performed between a line interface unit and a main processor according to an exemplary embodiment of the present invention.

FIG. 2 illustrates a diagram of an apparatus for synchronizing processor time, which is used in a data communication system 1, whereby internal and external time synchronization process of line interface units 10, 12, and 14 and a main processor 2 is performed, according to an exemplary embodiment of the present invention.

Referring to FIG. 2, line interface units (LIUs) 10, 12, and 14 are connected to a data path 108 of a network, through which the LIUs 10, 12, and 14 receive time messages. In one example, the LIUs 10, 12, and 14 each include a data processor 109, 110, and 114, respectively, and a local processor 112, 107, and 116, respectively. The data processors 109, 110, and 114 relay data at high speed. The local processors 112, 107, and 116 process and manage control data.

The local processors 112, 107, and 116 set a function of the respective data processors 109, 110, and 114 through message channels 111, 106, and 115, respectively, and transmit and receive messages and data to and from the respective data processors 109, 110, and 114 through the respective message channels 111, 106, 115. In each LIU 10, 12, 14, the data processor 109, 110, 114 is physically separated from the local processor 112, 107, 106 or the data processor 109, 110, 114, and the local processor 112, 107, 106 are implemented as a physically integrated entity while being logically separated from each other.

A local master processor (LP(M)) 112 of the LIU 10, which is connected to the data path 108, transmits and receives a time message to and from an external master device, and extracts a time difference between the local master processor 112 and the external master device. More specifically, the local master processor 112 transmits the time message to the external data path 108 through the data processor 109, and the data processor 109 relays a time message to the local master processor 112 when the time message is received through the external data path 108.

The system 1 further includes a trigger bus 101 and a time information synchronization bus 102 to apply the extracted time difference between the local master processor 112 and the external master device to both the local processors 112, 2, 107, and 116 and the data processors 109, 110, and 114 within the system 1.

The trigger bus 101 and the time information synchronization bus 102 may be physically separated buses. In this case, the trigger bus 101 is connected with the local processors 112, 2, 107, and 116, and the time information synchronization bus 102 is connected with the data processors 109, 110, and 114. Alternatively, the trigger bus 101 and the time information synchronization bus 102 may be physically integrated into one entity, and may be configured to implement the time synchronization mechanism logically, functionally differently, or consistently in accordance with the local processors 112, 2, 107, and 116, and the data processors 109, 110, and 114.

In one example, there are three methods for applying the time difference, between the external master device and the system extracted by the local master processor 112, to the processors within the system: a first method of synchronizing the time of all processors within a system to the time of the local master processor 112, a second method of synchronizing the time of all processors under the control of the main processor 2, and a third method of synchronizing the time of all processors by the cooperation between the local master processor 112 and the main processor 2.

Hereinafter, the first method of synchronizing the time of all the processors to the time of the local master processor 112 will be described. [A] First, the local master processor 112 synchronizes its timer with the time of the external device by reflecting the time difference between the local master processor 112 and the external device to its timer offset. [B] Then, the local master processor 112 time-synchronized with the external device activates the trigger bus 101, thereby allowing all processors 112, 2, 107, and 106 connected to the trigger bus 101 to simultaneously capture their personal timers and store it. [C] Among the trigger-bus-connected processors, the local processors 2, 107, and 106 receive or read the timer value captured by the local master processor 112, which has been time-synchronized with the external device, through the system network channels 7 and 3. [D] Thereafter, the local processors 2, 107, and 116 each compares its personal timer value with the timer value captured by the local main processor 112 and calculates a difference between the timer values, then reflects the calculated difference to its personal timer offset, thereby synchronizing its personal timer to the timer of the local master processor 112 that has been time-synchronized with the external device.

The second method of synchronizing the time of all processors under the control of the main processor 2 will now be described. [A] Time information 8 and 9 containing the time difference between the local master processor 112 and the external device, which is extracted by the local master processor 112, and information regarding the external device are transmitted to the main processor 2. [B] Then, the main processor 2 analyzes time information 8 and 9 to determine whether to use the time information as a system time reference. [C] When determining the use of the time information as a system time reference, the main processor 2 controls the local master processor 112 to be time-synchronized with the external device by issuing an instruction to compensate for the time difference that has been extracted by the local master processor 112. [D] Then, the main processor 2, or the local master processor 112 that has been time-synchronized with the external device, activates the trigger bus 101, thereby allowing all processors 112, 2, 107, and 106 connected to the trigger bus 101 to simultaneously capture their personal timers and store it. [E] The processors 2, 107, and 116 receive or read the timer value captured by the local master processor 112 through the system network channels 7 and 3. [F] Then, the processors 2, 107, and 116 each may compare the previously captured personal timer value with the captured timer value of the local master processor 112 that has been time-synchronized with the external device, calculate a difference between the captured timer values, and reflect the calculated difference to their personal timer offsets, thereby being able to synchronize the own timer to the timer of the local master processor 112.

The third method, which is different from the aforementioned synchronization methods, is provided to synchronize the time of all processes within the system according to the allocation of roles to the main processor 2 and the local master processor 112 that is time-synchronized with the external device. The data processors 109, 110, and 114 can synchronize their timers to the timer of the local master processor 112 that has been synchronized with the external device using the above described methods.

Figure 3:
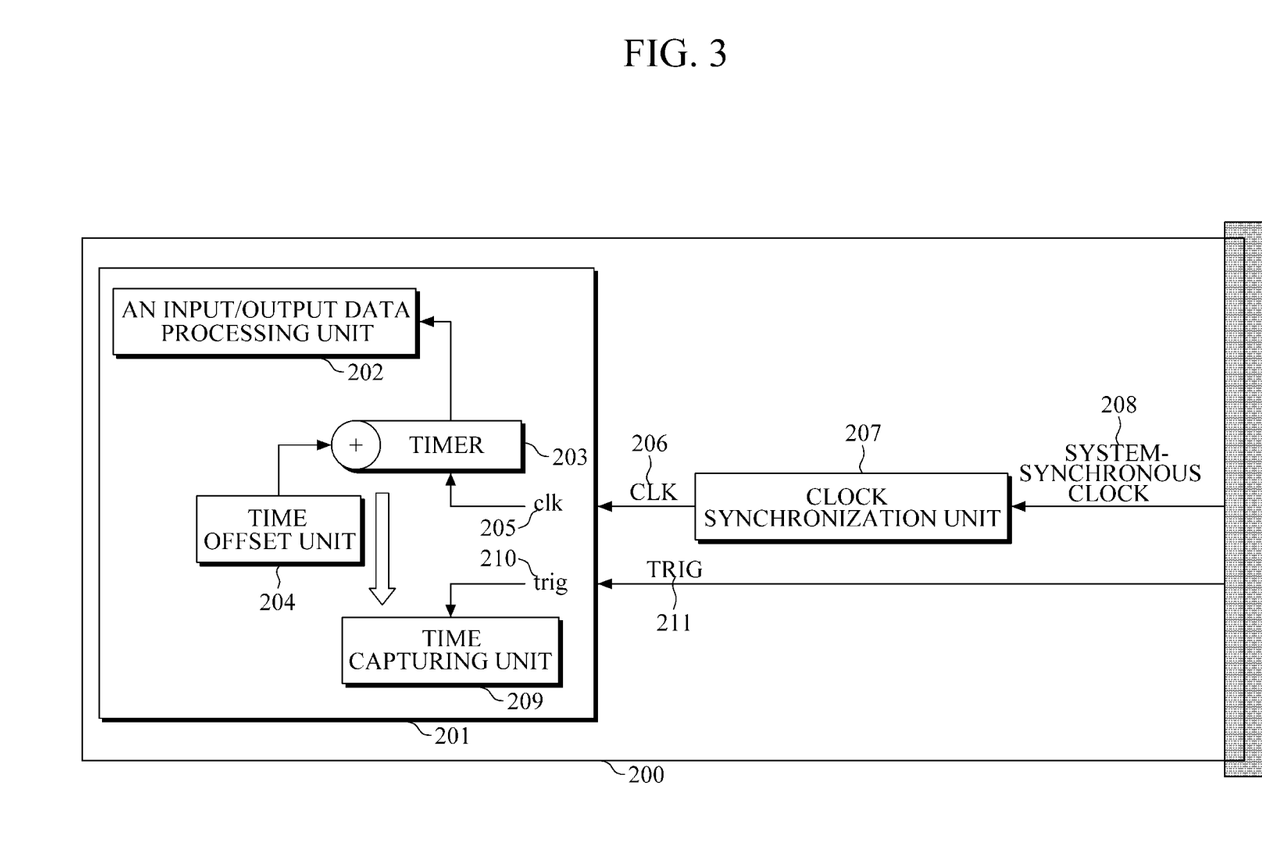
FIG. 3 is a diagram illustrating a processor time synchronization apparatus according to an exemplary embodiment of the present invention.

FIG. 3 illustrates a diagram of an apparatus for synchronizing processor time.

Referring to FIG. 3, the apparatus 200 includes a clock synchronization unit 207 and a time synchronization unit, including an input/output data processing unit 202, a timer 203, a time capturing unit 205, and a time offset unit 204.

The apparatus 200 that substitutes for a line interface unit, a main processor, a switch, or the like is connected through a backplane or a cable to a system-synchronous clock 208 common in the system. Then, the system-synchronous clock 208 may be converted into a reference clock 206 by the clock synchronization unit 207, or transmitted to the time synchronization unit 201 without conversion. The system-synchronous clock 208 may be a data-synchronous clock extracted by line interface of the line interface unit, an external clock additionally input to the system, or the system's personal clock. The reference clock 206 is input to a timer clock 205 of the time synchronization unit 201, and the timer 203 changes a timer value to a value of the timer clock 205.

The input/output data processing unit 202, which transmits and receives messages to and from the external device, uses the timer 203 to display data input/output time of corresponding data, and stores the data input/output time in storage of a processor. A value of the timer 203 may be directly set by inputting a value, or indirectly set by changing the value to a desired value using the time offset unit 204. When inputting a value to the time offset unit 204, the value of the timer 203 is changed by a value of the time offset 204. According to the update process for a value of the timer 203 via the time offset unit 204, the real-time software process can be performed without limitations.

In one example, a trigger signal 211 common in the system is connected to the apparatus through a backplane or a cable, and the apparatus 200 inputs the trigger signal 211 to a time capture trigger 210 of the time synchronization unit 201. When the trigger signal 211 is activated, a value of the timer 203 at the time of activation is stored in the time capturing unit 209. Thereafter, the timer's value stored in the time capturing unit 209 is used to compare the times of other processors in the internal time synchronization process.

Figure 4A:
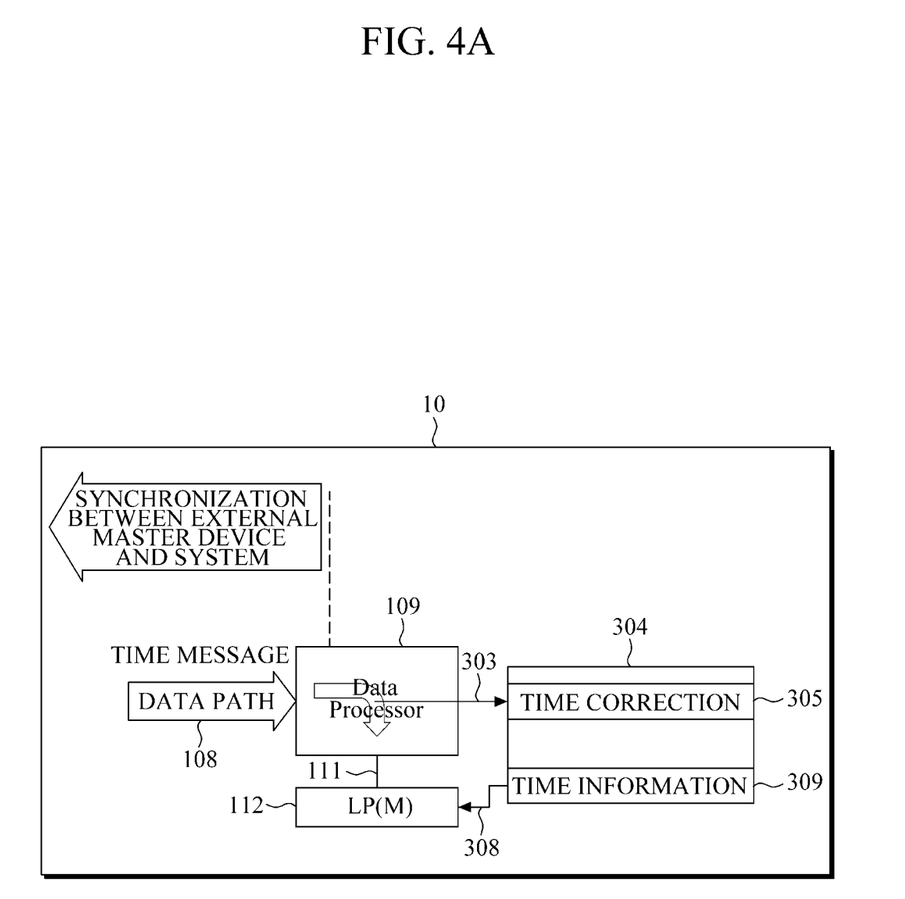
FIGS. 4A and 4B are diagrams for explaining a system's external time synchronization process performed between a local processor and a data processor according to an exemplary embodiment of the present invention.
Figure 4B:
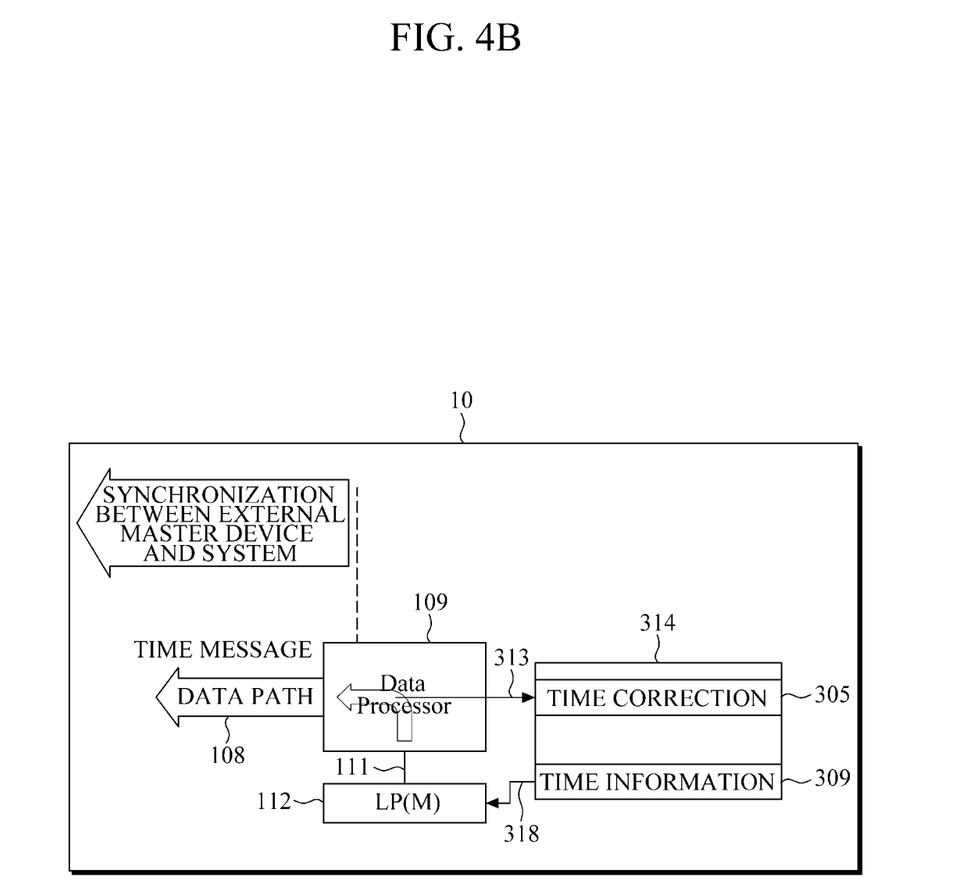

FIGS. 4A and 4B illustrate a diagram for explaining an external time synchronization process through a local processor and a data processor according to an exemplary embodiment of the present invention.

More specifically, FIG. 4A illustrates a line interface unit 10 that receives a time message from an external device, and in which a local processor 112 and a data processor 109 processes the time message 304 according to an exemplary embodiment of the present invention.

Referring to FIG. 4A, in response to the time message 304 input to the data processor 109 through a data path 108, the data processor 109 recognizes the input time message 304, and delivers the time message 304 to the local processor 112 through a message channel. In this case, the data processor 109 reflects (303) the duration in which the time message 304 is present in the data processor 109 to a time correction field 305 in the time message 304.

The local processor 112 receives the time message 304, reads a time information field 309 in the time message 304, identifies a departure time of the time message 304, checks the time correction field 305, and extracts the duration in which the time message 304 is present in the data processor 109, between the external device and the local processor 112. In response to the time message 304 input through the message channel 111, the local processor 112 makes a record of an arrival time of the time message 304 with the local processor's personal timer.

FIG. 4B illustrates the line interface unit 10 that transmits a time message 314 to an external device, and in which the local processor 112 and the data processor 109 processes the time message 314 according to an exemplary embodiment of the present invention.

Referring to FIG. 4B, the local processor 112 delivers the time message 314 to the data processor 10 through the message channel 111, and the data processor 109 finds a data path 108 corresponding to destination information of the time message 314, and transmits the time message 314 through the found data path 108. In this case, the data processor 109 reflects (313) the duration in which the time message 314 is present in the data processor 109 to a time correction field 305 of the time message 314. The data path 108 may be a line interface extending from the data processor 109 itself, or a line interface from another data processor present beyond a data switching unit. The data switching unit is connected to the data processors of the line interface unit, and performs switching and relaying of data between the data processors.

The local processor 112 inputs (318) the departure time of the time message 314 to a time information field 309 in the time message 314. Additionally, the departure time of the time message 314 is recorded, along with time message ID, in a separate storage space in the local processor 112.

According to the exemplary embodiments of the present invention, it is possible to perform reliable internal and external high time-resolution time synchronization and share time information in a data communication system, which includes a plurality of processors and line interfaces, by recognizing a time difference between an external device and the system, internally transmitting and receiving time information, containing the time difference, among the processors, synchronizing the internal processors based on the time difference between the external device and the system, and executing software processes in real time, without limitations, in the course of time synchronization.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor time synchronization apparatus in a data communication system, the processor time synchronization apparatus comprising:
   a main processor;
   a first local processor and a second local processor;
   a trigger bus connecting the first and second local processors; and
   a system network channel that connects the first and second local processors to the main processor and is separate from the trigger bus, wherein
   the first local processor is configured to
      receive a time message from an external device,
      extract a time difference between the first local processor and the external device from the received time message,
      synchronize time between the first local processor and the external device using the extracted time difference, and
      activate the trigger bus for simultaneous local time capture, and capture a value of a personal timer of the first local processor; and
   the second local processor is configured to, after time-synchronization between the first local processor and the external device,
      capture a value of a personal timer of the second local processor, in response to the first local processor's activation of the trigger bus and simultaneously to the capturing of the personal timer value of the first local processor,
      receive the timer value captured by the first local processor from the first local processor, and
      synchronize a system internal time with the first local processor using a difference between the received timer value of the first local processor and the captured timer value of the second local processor,
   wherein the first local processor and the second local processor share the captured value of their respective personal timer through the system network channel.

2. The processor time synchronization apparatus of claim 1, wherein the first local processor reflects the extracted time difference to a personal timer offset to synchronize time between the personal timer of the first local processor and the external device.

3. The processor time synchronization apparatus of claim 1, wherein the second local processor reflects the difference between the received timer value of the first local processor and the captured timer value of the second local processor to a timer offset of the second local processor, so as to synchronize the personal timer with the personal timer of the first local processor.

4. The processor time synchronization apparatus of claim 1, further comprising:
   a first data processor configured to
      recognize the time message received from the external device, and deliver the time message to the first local processor,
      display processing time of the first data processor in the time message, and
      synchronize its personal time to the system's internal time; and
   a second data processor configured to receive time information from the first data processor which has been time-synchronized with the external device, the time information containing a time difference between the external device and the data communication system, and synchronize the first data processor with the system's internal time using the received time information.

5. The processor time synchronization apparatus of claim 4, wherein the first and second data processors are activated or deactivated via a time information synchronization bus.

6. The processor time synchronization apparatus of claim 4, wherein
   the first and second data processors each
      recognize a time message received from the external device through a data path,
      reflect a duration in which the time message is present in the first or second data processor to a time correction field in the time message, and
      deliver the time message to a corresponding local processor through a message channel, and
   the local processor that receives the time message through the message channel reads a time information field in the time message to identify a departure time of the time message and the duration of time in which the time message was present in the data processor, and makes a record of an arrival time of the time message with a personal timer of the local processor.

7. The processor time synchronization apparatus of claim 1, wherein
   a system-synchronous clock in common to processors is converted into a timer reference clock of each processor, and then input to a timer clock of each processor, or
   the system-synchronous clock is input to the timer clock intact, and the timer of each processor changes a timer value in accordance with the timer clock.

8. A processor time synchronization apparatus in a data communication system, the processor time synchronization apparatus comprising:
   a main processor,
   a plurality of local processors including a first local processor and a second local processor;
   a trigger bus connecting the main processor and the plurality of local processors, the trigger bus being activable for simultaneous local time capture of the local processors; and
   a system network channel that connects the plurality of local processors to the main processor and is separate from the trigger bus, wherein
   each of the plurality of local processor is configured to
      recognize a time difference between the data communication system and a corresponding external device, by exchanging a time message with the corresponding external device, and to generate time information containing the recognized time difference;
   the main processor is configured to
      receive the time information from the local processors,
      analyze the received time information to select the first local processor, and
      instruct the first local processor to compensate for the time difference between the data communication system and the external device corresponding to the first local processor;
   the first local processor is further configured to
      synchronize time between the external device corresponding thereto and the data communication system in response to the main processor's instruction to compensate for the time difference, and capture a value of a personal timer of the first local processor in response to an activation of the trigger bus;

the second local processor is further configured to
capture a value of a personal timer of the second local processor, in response to the activation of the trigger bus and simultaneously to the capturing of the personal timer value of the first local processor,
receive another time information from the time-synchronized first local processor, and
synchronize the second local processor with the system's internal time using the received another time information and the captured timer value of the second local processor;

the first local processor or the main processor is configured to activate the trigger bus after the synchronization with the external device; and the first local processor and the second local processor share the captured value of their respective personal timer through the system network channel.

9. The processor time synchronization apparatus of claim 8, wherein the first local processor reflects its recognized time difference to a timer offset of the first local processor in response to the main processor's instruction to compensate for the time difference, thereby synchronizing time between the personal timer thereof and the external device.

10. The processor time synchronization apparatus of claim 8, wherein the second local processor calculate a time difference between the captured timer value of the first local processor with the captured timer value of the second local processor, and reflects the calculated time difference to a personal timer offset to synchronize the personal timer thereof with the personal timer of the first local processor that has been time-synchronized with the external device.

11. The processor time synchronization apparatus of claim 8, wherein analyzes performance of each external device based on the received time information to select time information of a particular external device as reference time information of the system.

12. The processor time synchronization apparatus of claim 8, wherein each of the local processors transmits and receives a time message independently of the other local processors to and from a different external device, and the main processor activates or deactivates the transmission and reception of the time message of each local processor.

13. The processor time synchronization apparatus of claim 8, further comprising:
a data processor configured to recognize a time message, transmit the time message to a corresponding local processor, display a personal processing time in the time message, and synchronize a personal time of the corresponding local processor to the system's internal time.

14. The processor time synchronization apparatus of claim 8, wherein
the system-synchronous clock in common to the main and local processors is converted into a timer reference clock of each processor, and then input to a timer clock of each processor, or the system-synchronous clock is input to the timer clock of each processor intact, and the timer of each processor changes a timer value in accordance with the timer clock.

15. The processor time synchronization apparatus of claim 8, further comprising:
a switching unit configured to deliver the time information between the local processors and the main processor through the system network channel.

16. A processor time synchronization method of a processor time synchronization apparatus in a data communication system, the processor time synchronization apparatus including a main processor, and a first local processor and a second local processor connected by a trigger bus, the processor time synchronization method comprising:
an external time synchronization stage comprising:
receiving, by the first local processor, a time message from an external device,
extracting a time difference between the first local processor and the external device from the received time message,
synchronizing time between the first local processor and the external device using the extracted time difference, and
activating the trigger bus for simultaneous local time capture, and capturing a value of a personal timer of the first local processor; and
an internal time synchronization stage comprising, after time-synchronization between the first local processor and the external device,
capturing, by the second local processor, a value of a personal timer of the second local processor, in response to the first local processor's activation of the trigger bus and simultaneously to the capturing of the personal timer value of the first local processor,
receiving the timer value captured by the first local processor from the first local processor, and
synchronizing the system's internal time with the first local processor using a difference between the received timer value of the first local processor and the captured timer value of the second local processor, wherein
the first local processor and the second local processor share the captured value of their respective personal timer through a system network channel that connects the first and second local processors to the main processor and is separate from the trigger bus.

17. The processor time synchronization method of claim 16, wherein the internal time synchronization stage comprises, after the time synchronization between the first local processor and the external device, calculating a time difference between the timer value captured by the first local processor and the captured timer value of the second local processor, and synchronizing the timer of the second local processor to the timer of the first local processor by reflecting the calculated difference to a timer offset of the second local processor.

* * * * *